UNITED STATES PATENT OFFICE.

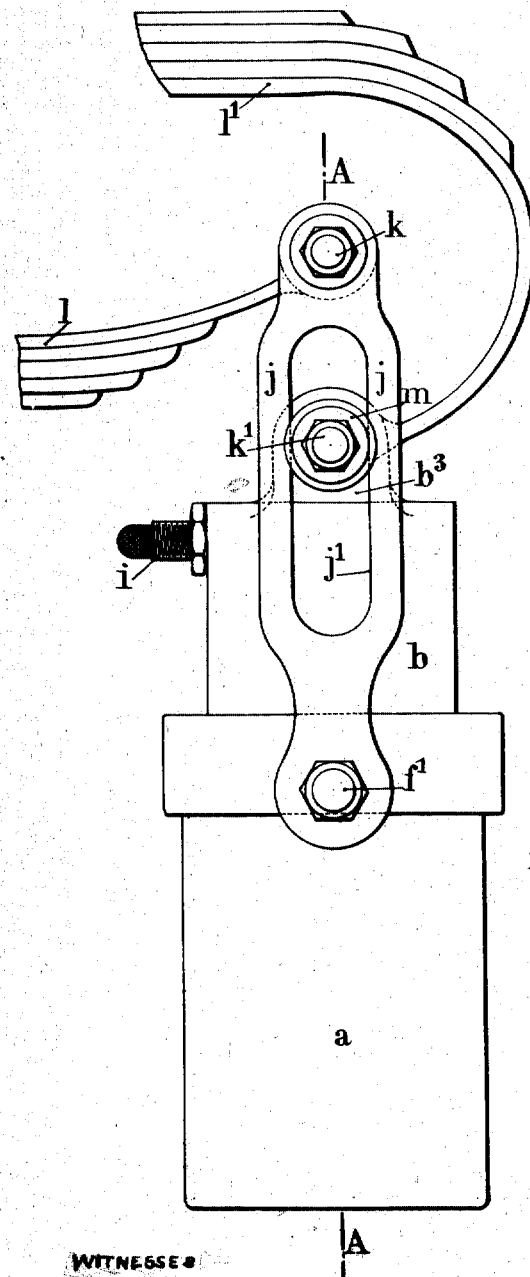
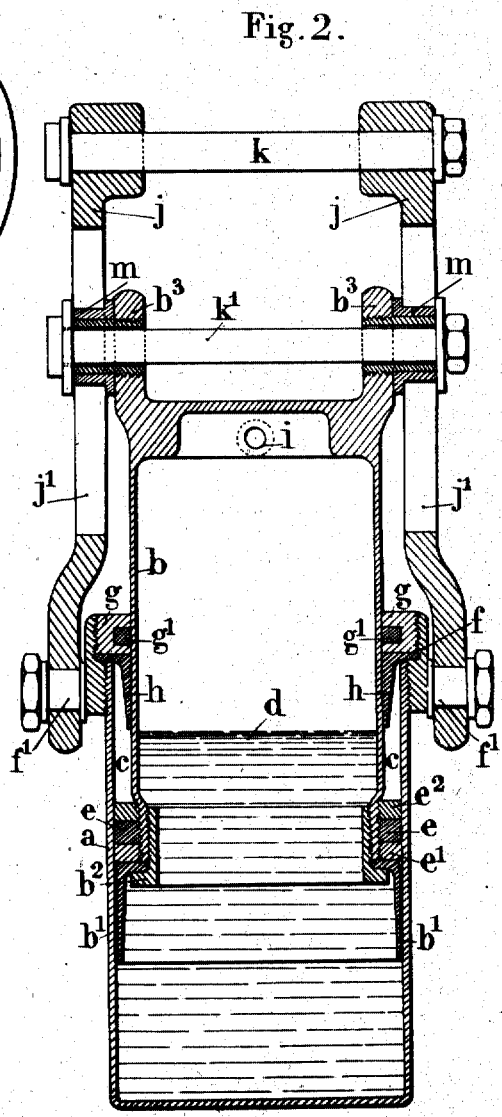

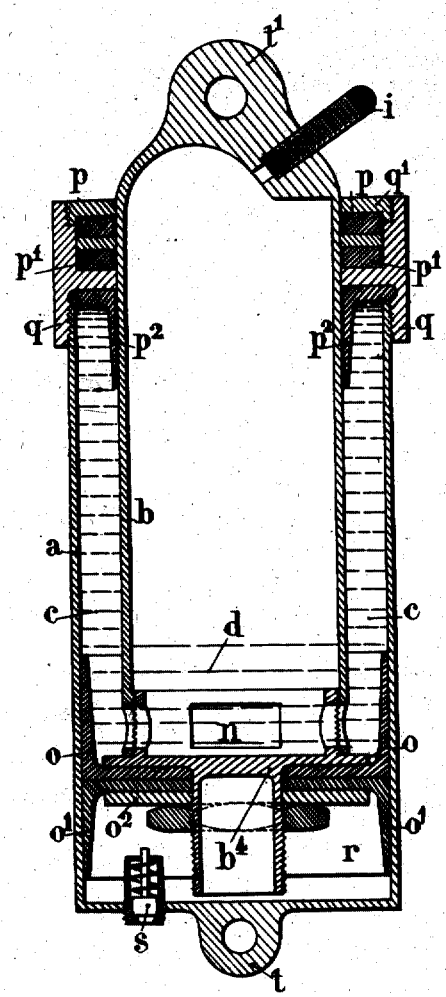

JEAN PAUL SINSOU, OF LEVALLOIS-PERRET, FRANCE, ASSIGNOR TO SOCIÉTÉ ANONYME DES AMORTISSEURS ET SUSPENSIONS "OLÉO PNEUMATIQUES", OF BILLANCOURT, FRANCE.

SHOCK-ABSORBING ARRANGEMENT FOR VEHICLES.

1,278,772.　Specification of Letters Patent.　Patented Sept. 10, 1918.

Application filed January 13, 1914.　Serial No. 811,924.

*To all whom it may concern:*

Be it known that I, JEAN PAUL SINSOU, of 2 Rue Fromont, Levallois-Perret, Seine, Republic of France, have invented Improvements in Shock-Absorbing Arrangements for Vehicles, of which the following is a full, clear, and exact description.

Shock absorbing arrangements for vehicles as heretofore constructed may be grouped in two classes, namely those that are wholly pneumatic and those that are hydropneumatic.

Shock absorbers of the first mentioned class, namely the wholly pneumatic type, are not satisfactory in that they allow the air to escape very rapidly in consequence of leakages which take place between the parts in contact or, if the air is contained in a flexible casing of leather or rubber, in consequence of the molecular change which is produced in the material of which the said casing is formed, under the action of the changes in shape it is compelled to assume.

Shock absorbers of the second type namely hydropneumatic shock absorbers are generally provided with pipes and valves adapted to control or regulate the passage of the liquid from one chamber to the other and to retard the flow of such liquid in order to obtain a braking action when the parts constituting the shock absorber return to their original position. In such shock absorbers, owing to the continuous passage of the liquid through the pipes and valves, it is found that at the end of a certain time the absorbers no longer work under the original conditions.

The object of the present invention is to provide a shock absorber of the hydropneumatic type in which the disadvantages just referred to are obviated.

For this purpose according to the invention the liquid contained in the improved shock absorber constitutes only a hydraulic joint or seal for the air inclosed in the compression chamber. The braking of the apparatus is obtained by air, which is drawn into an auxiliary chamber provided for this purpose, when the piston moves under the action of a shock and which is then compressed by the piston on its return movement.

The arrangement is such that the braking is produced not by the compressed air or the liquid of the shock absorbing apparatus proper, but as has been just stated, by air from outside which is compressed in an auxiliary chamber by the action of the apparatus itself. The result of this is that neither loss of compressed air or liquid in the shock absorbing apparatus proper nor the formation of this liquid into layers can take place and in consequence of this the apparatus always works under the same standard conditions.

Figure 1 of the accompanying illustrative drawing shows in elevation one example of shock absorber constructed according to the invention.

Fig. 2 is a vertical section corresponding to the line A—A of Fig. 1.

Fig. 3 illustrates a modified construction in vertical section in a plane at right angles to that of Fig. 2.

Referring to Figs. 1 and 2 it will be seen that the improved shock absorber comprises a cylindrical body $a$ within which is arranged to work a hollow piston $b$ that projects through the open upper end thereof. The diameter of the piston $b$ is less than the bore of the body or cylinder $a$ so that an annular chamber $c$ is formed between the two parts.

The lower end of the piston $b$ is furnished with a packing ring $b'$ of leather which is pressed up into cup shape or is flanged as shown and held in position by a ring nut $b^2$ screwed into the interior of the said piston. The packing ring $b'$ prevents the liquid $d$, within the cylindrical body $a$ and the lower part of the piston $b$, from passing into the annular chamber $c$. The quantity of liquid $d$ contained in the apparatus is such that this liquid always forms a hydraulic joint or seal whatever be the position of the piston $b$.

Above the leather packing ring $b'$ the exterior of the piston $b$ is furnished with another packing ring $e$ of felt, leather or rubber, held between two rings $e'$ and $e^2$ screwed onto the piston.

This ring $e$ completes the packing at the lower part of the apparatus and forms with the rings $e'$ and $e^2$ an efficient guiding arrangement for the piston $b$.

Screwed to the upper part of the cylindrical body $a$ is a metal ring $f$ provided with two trunnions $f'$ located diametrically opposite to each other and the function of which will be described hereinafter. Into the upper part of the ring $f$ is screwed a ring $g$ formed on its internal periphery with a groove into which is fitted a rubber ring $g'$. The rings $g$ and $g'$ form an efficient guiding arrangement for the upper part of the piston $b$ and serve at the same time to prevent mud, water and dust from entering the annular chamber $c$.

To render the annular chamber $c$ fluid-tight at its upper part a packing ring $h$ of leather is pressed into the shape shown, that is, angular or L-shaped in cross section. The ring $h$ is held in position by being nipped between the top end of the cylinder $a$ and the ring $g$ and bears upon the external surface of the piston $b$.

At its upper part the piston is fitted with a valve $i$ through which air can be introduced into the apparatus and compressed according to the weight to be supported by the piston $b$.

In the example illustrated the shock absorber is mounted on the vehicle in the following manner:

Mounted upon the trunnions $f'$ of the cylindrical body $a$ are two shackles $j$ connected at their upper parts by a bolt $k$ which is carried by one end of the spring $l$ of the wheel axle. Each of the shackles $j$ is formed with a slot $j'$ into which fits and slides vertically one end of a bolt $k'$ which passes through two lugs $b^3$ fixed to or formed in one with the piston $b$ and projecting from the upper part thereof. The bolt $k'$ is connected to one end of the spring $l'$ fixed to the chassis of the vehicle.

To facilitate the smooth sliding of the ends of the bolt $k'$ in the slots of the shackles, the said bolt is furnished with two rollers $m$ that roll over the edges of the said slots.

The action of the improved shock absorber constructed as just described is as follows:—

The cylindrical body $a$ contains the requisite quantity of liquid and the compression chamber formed by the piston $b$ incloses the air compressed to the desired pressure. If the wheel of the vehicle encounters any obstacle a shock will be produced which will cause the axle to rise relatively to the chassis of the vehicle. The result of this is that the piston $b$ will descend in the cylinder $a$. The air contained in the piston not being able to escape by reason of the fluid-tight joint or seal formed by the liquid the level of which remains constant, will be compressed thus creating a resistance which deadens the shock.

When the piston $b$ descends, the packing $b'$, by reason of the pressure exercised by the air on the liquid, will bear with constantly increasing force against the inner wall of the cylinder $a$, which increases the friction of the said packing against the cylinder and thus permits of a slight braking action being obtained during the descent.

It should be noted that the resistance produced by the compression of the air in the cylinder $b$ is progressive so that great flexibility is imparted to the apparatus because whatever be the violence of the shock the compression of the air contained in the piston will only pass progressively from one value to another. On the other hand the descent of the piston $b$ tends to create a vacuum in the annular chamber $c$, but owing to the arrangement of the packing $h$, a certain quantity of atmospheric air is drawn into this chamber.

When the piston $b$, after having arrived at the end of its stroke, reascends to resume its original position under the action of the compressed air which it contains, the atmospheric air drawn into the chamber $c$ will be compressed progressively by the movement of the said piston, the packing ring $h$ being then pressed by the air against the piston so as only to allow the air to escape again little by little.

There will thus be obtained a progressive braking action of the piston which returns gently to its original position which avoids all shock on the return and that moreover without the intervention of agents which permit of the deadening of the shock when the piston descends.

The modified construction of shock absorber shown in Fig. 3 is suitable for cases where it has to work by extension.

In this construction the lower end of the piston $b$ is closed by a screw-threaded base $b^4$ having large lateral openings $n$ which establish communication between the piston chamber and the annular chamber $c$ arranged between the piston and the inner wall of the cylinder $a$. The chamber $c$ is full of liquid which can freely pass into the body of the piston $b$ through the openings $n$.

The fluid-tightness of the annular chamber $c$ is insured at its lower part by two pressed up leather packing rings $o$ and $o'$ held in position on the one hand by the base $b^4$ and on the other hand by a nut $o^2$; and at its upper part by plain packing rings $p$ and $p'$ and a pressed up leather ring $p^2$ held in position by nuts $q$ and $q'$.

The chamber $r$ formed in the cylindrical body $a$ beneath the piston $b$ is capable of being placed in communication with the atmosphere through a valve $s$ suitably arranged.

Finally the apparatus is fitted with a valve $i$ which permits the air to be compressed in the body of the piston $b$, and is provided with two lugs $t$ and $t'$ fixed respectively to the cylinder $a$ and to the piston and permitting of the attachment of the apparatus to the vehicle in any suitable manner.

The apparatus thus constructed works in the following manner:

When a shock is produced, the piston $b$ rises in the cylinder $a$ the liquid contained in the annular chamber $c$ is then forced back and passes through the openings $n$ into the chamber of the piston $b$ where it compresses the air contained in the said chamber.

On the other hand the upward movement of the piston $b$ tends to create in the chamber $r$ at the lower part of the cylinder $a$ a vacuum the result of which is to cause the valve $s$ to open automatically so that atmospheric air enters the chamber.

When the piston returns to its normal position the air in the chamber $r$ is compressed and exercises a braking action which permits the piston to return without shock to its original position.

As in the preceding arrangement the braking action is therefore obtained independently of agents which absorb the initial shock so that satisfactory working of the apparatus is always insured as all risk of leakage is obviated.

The improved shock absorbing arrangement may be applied to any vehicles propelled either by mechanical, animal or even human traction and may be placed at any convenient point on the said vehicle.

The constructions hereinbefore described are only given by way of example, the forms, dimensions and detail arrangements may vary according to circumstances without departure from the invention.

Claims:

1. A hydropneumatic shock absorber for vehicles, comprising a cylindrical hollow body closed at its lower part and containing a liquid, a hollow piston entirely open at its lower part and fitted in the cylindrical body, a fluid-tight packing at the inner end of said piston, a determined quantity of air under pressure filling the rest of the space of the cylindrical body and the piston, an annular chamber formed by and between the walls of the cylindrical body and the inner end of the piston, a packing at the upper part of the cylindrical body for allowing air to pass into the annular chamber when the descending movement of the piston takes place and retaining said air which is compressed on the return stroke of the piston, and means for connecting the apparatus to the springs of the vehicle.

2. A hydropneumatic shock absorber for vehicles, comprising a cylindrical hollow body closed at its lower part, and containing a determined quantity of liquid, a hollow piston entirely open at its lower part and fitted in the cylindrical body, a fluid-tight packing at the base of said piston, constantly immersed in the liquid, compressed air filling the rest of the space of the cylindrical body and the piston, a valve arranged at the upper part of the piston for the introduction of the liquid and of the air, an annular chamber formed between the walls of the cylindrical body and of the piston, and a packing arranged at the upper part of the cylindrical body for allowing atmospheric air to pass into the annular chamber when the descending movement of the piston takes place and then for retaining said air which is compressed and escapes but slowly through said packing on the return stroke of the piston.

3. A hydropneumatic shock absorber for vehicles comprising a cylindrical hollow body closed at its lower part, and containing a determined quantity of liquid, trunnions on the cylindrical body, shackles receiving said trunnions and connected with the axle spring, a hollow piston entirely open at its lower part and fitted in the cylindrical body, a fluid-tight packing at the base of said piston, constantly immersed in the liquid, compressed air in the piston and retained by the liquid forming a hydraulic joint, a valve at the upper part of the piston for the introduction of the air and liquid into the apparatus, lugs on the piston and connected with the upper spring of the vehicle, an annular chamber formed between the walls of the cylindrical body and of the piston, and a packing at the upper part of the cylindrical body for allowing atmospheric air to pass into the annular chamber when the piston moves down and then for retaining said air which is compressed and escapes but slowly between the edge of this packing and the wall of the piston on the return stroke of the latter.

4. In a shock absorber, a liquid-containing cylinder, a hollow piston operating therein and having an interior air chamber sealed at one end by the liquid of the cylinder to cause compression of the air by a movement of the piston in one direction, and a secondary air chamber formed by the inner end of the piston and cylinder in which air is compressed by an opposite movement of the piston to produce a braking action for the piston on its return movement.

The foregoing specification of my improvements in shock absorbing arrangements for vehicles signed by me this 29th day of December, 1913.

JEAN PAUL SINSOU.

Witnesses:
HANSON C. COXE,
RENÉ THIRIOT.